United States Patent
Fard et al.

(10) Patent No.: US 11,500,185 B2
(45) Date of Patent: Nov. 15, 2022

(54) CATADIOPTRIC AND REFRACTIVE OPTICAL STRUCTURES FOR BEAM SHAPING

(71) Applicant: Meta Platforms Technologies, LLC, Menlo Park, CA (US)

(72) Inventors: Erfan M. Fard, Redmond, WA (US); Robin Sharma, Redmond, WA (US); Karol Constantine Hatzilias, Kenmore, WA (US); Christopher Yuan-Ting Liao, Menlo Park, CA (US); Andrew John Ouderkirk, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 416 days.

(21) Appl. No.: 16/593,977

(22) Filed: Oct. 5, 2019

(65) Prior Publication Data
US 2020/0150408 A1    May 14, 2020

Related U.S. Application Data

(60) Provisional application No. 62/758,462, filed on Nov. 9, 2018.

(51) Int. Cl.
*G02B 17/08* (2006.01)
*G02B 27/00* (2006.01)
(Continued)

(52) U.S. Cl.
CPC ....... *G02B 17/086* (2013.01); *G02B 27/0093* (2013.01); *G02B 27/141* (2013.01);
(Continued)

(58) Field of Classification Search
CPC ............ G02B 17/086; G02B 27/0093; G02B 27/141; G02B 27/0172; G02B 2027/0178; H04N 5/33
(Continued)

(56) References Cited

U.S. PATENT DOCUMENTS 6,239,915 B1    5/2001    Takagi et al.
10,445,896 B1 *  10/2019    Bills .................. G06T 7/70
(Continued)

FOREIGN PATENT DOCUMENTS

CN    101359089 A    2/2009
CN    106164745 A    11/2016
(Continued)

OTHER PUBLICATIONS

Hua Hong et al, A compact eyetracked optical see-through head-mounted display, Proceedings of SPIE, vol. 8288, Feb. 9, 2012.
(Continued)

*Primary Examiner* — Collin X Beatty
(74) *Attorney, Agent, or Firm* — Freestone Intellectual Property Law PLLC; Aaron J. Visbeek

(57) ABSTRACT

A near-eye optical element includes one or more infrared light sources and an optical structure. The one or more infrared light sources emit infrared beams. The optical structure includes an optically transparent material disposed over the emission aperture(s) of the infrared light source(s). The optical structure includes one or more facets that diverge the infrared beams.

18 Claims, 13 Drawing Sheets

(51) Int. Cl.
  *H04N 5/33* (2006.01)
  *G02B 27/14* (2006.01)
  *G02B 27/01* (2006.01)
(52) U.S. Cl.
  CPC ............ *H04N 5/33* (2013.01); *G02B 27/0172* (2013.01); *G02B 2027/0178* (2013.01)
(58) Field of Classification Search
  USPC ........................................................ 359/833
  See application file for complete search history.

(56) References Cited

U.S. PATENT DOCUMENTS

| | | |
|---|---|---|
| 2002/0097505 A1 | 7/2002 | DeLong |
| 2004/0183749 A1* | 9/2004 | Vertegaal ................. G06F 3/14 345/7 |
| 2012/0050681 A1* | 3/2012 | Bonnin ................. A61B 3/113 351/210 |
| 2012/0162549 A1* | 6/2012 | Gao ..................... G02B 27/283 359/651 |
| 2013/0187943 A1 | 7/2013 | Bohn et al. |
| 2013/0300636 A1* | 11/2013 | Cunningham .......... G10L 13/02 345/8 |
| 2014/0055746 A1 | 2/2014 | Nistico et al. |
| 2014/0361957 A1 | 12/2014 | Hua et al. |
| 2017/0035293 A1* | 2/2017 | Nistico ................. A61B 3/024 |
| 2018/0113316 A1 | 4/2018 | Hua et al. |
| 2018/0113508 A1 | 4/2018 | Berkner-Cieslicki et al. |
| 2022/0015630 A1* | 1/2022 | Border .................. G02C 11/10 |

FOREIGN PATENT DOCUMENTS

| | | |
|---|---|---|
| WO | 0233472 A2 | 4/2002 |
| WO | 2015017291 A1 | 2/2015 |

OTHER PUBLICATIONS

International Searching Authority, Patent Cooperation Treaty, European Application No. PCT/US2019/060394, dated May 12, 2020, 17 pages.

Office Action dated Jul. 25, 2022 for Chinese Application No. 201980073838.4, filed Nov. 8, 2019, 20 pages.

* cited by examiner

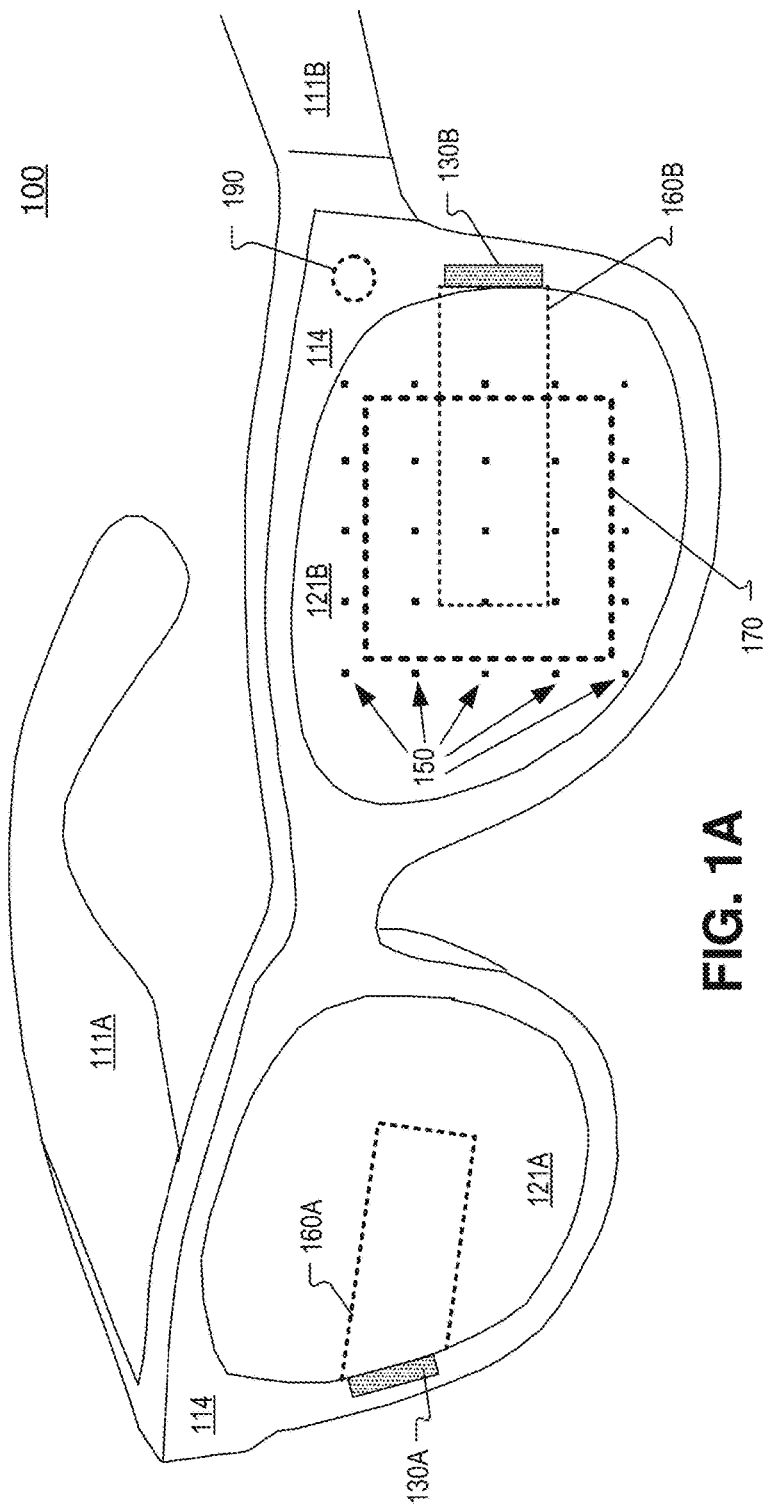
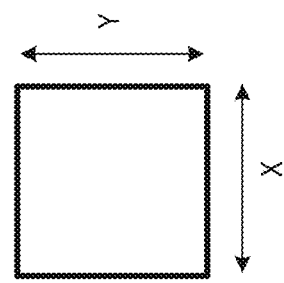
FIG. 1A
FIG. 1B

CATADIOPTRIC AND REFRACTIVE OPTICAL STRUCTURES FOR BEAM SHAPING

CROSS-REFERENCE TO RELATED APPLICATIONS

This application claims priority to U.S. provisional Application No. 62/758,462 filed Nov. 9, 2018, which is hereby incorporated by reference.

BACKGROUND INFORMATION

There are a variety of application where illuminators such as vertical-cavity surface-emitting lasers (VCSELs) and LEDs are utilized as light sources. In some applications, it may be desirable to shape the beam emitted from the illuminator. In one particular context, light sources may be utilized to illuminate a subject for purposes of imaging the subject.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIGS. 1A-1B illustrate an example head mounted display (HMD) that includes an array of VCSELs emitting near-infrared light in an eyebox direction, in accordance with aspects of the disclosure.

DETAILED DESCRIPTION

Figure 2:
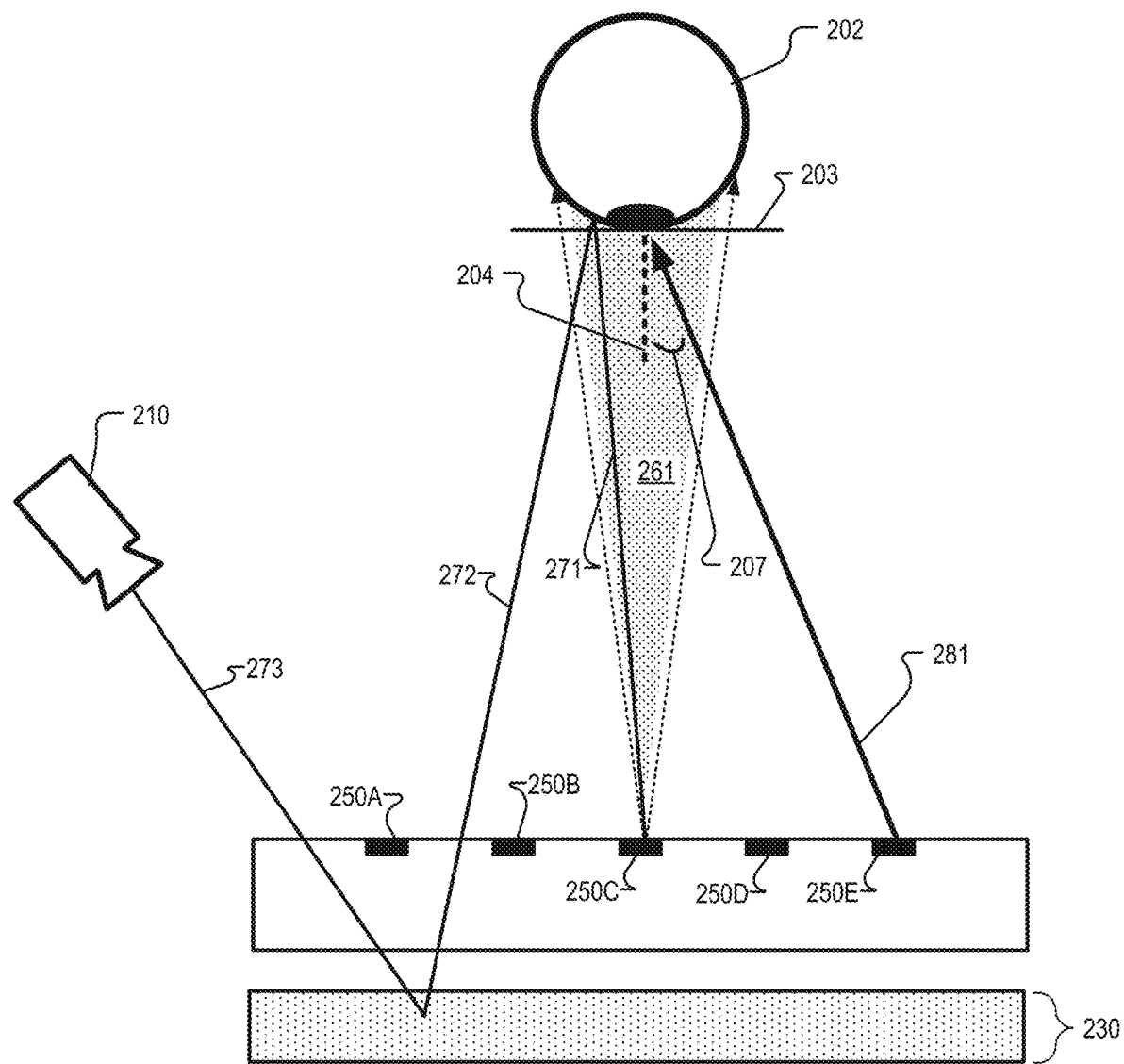
FIG. 2 illustrates an example system that includes a side view of an array of VCSELs illuminating an eyebox area, in accordance with aspects of the disclosure.

Embodiments of a near-eye optical structure for diverging and tilting infrared light are described herein. The near-eye optical element may include refractive or catadioptric (reflecting and refracting) designs to direct the infrared light in an eyeward direction. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

FIG. 1A illustrates an example head mounted display (HMD) 100 that includes an array of VCSELs emitting non-visible light (e.g. near-infrared light) in an eyebox direction, in accordance with an embodiment of the disclosure. HMD 100 includes frame 114 coupled to arms 111A and 111B. Lenses 121A and 121B are mounted to frame 114. Lenses 121 may be prescription lenses matched to a particular wearer of HMD or non-prescription lenses. Lenses 121 may be considered a near-eye optical element, in some embodiments. The illustrated HMD 100 is configured to be worn on or about a head of a user of the HMD.

In FIG. 1A, each lens 121 includes a waveguide 160 to direct image light generated by a display 130 to an eyebox area for viewing by a wearer of HMD 100. Display 130 may include an LCD, an organic light emitting diode (OLED) display, micro-LED display, quantum dot display, pico-projector, or liquid crystal on silicon (LCOS) display for directing image light to a wearer of HMD 100.

The frame 114 and arms 111 of the HMD may include supporting hardware of HMD 100. HMD 100 may include any of processing logic, wired and/or wireless data interface for sending and receiving data, graphic processors, and one or more memories for storing data and computer-executable instructions. In one embodiment, HMD 100 may be configured to receive wired power. In one embodiment, HMD 100 is configured to be powered by one or more batteries. In one embodiment, HMD 100 may be configured to receive wired data including video data via a wired communication channel. In one embodiment, HMD 100 is configured to receive wireless data including video data via a wireless communication channel.

Lenses 121 may appear transparent to a user to facilitate augmented reality or mixed reality where a user can view scene light from the environment around her while also receiving image light directed to her eye(s) by waveguide(s) 160. Lenses 121 may include an optical combiner 170 for directing reflected near-infrared light (emitted by infrared light sources 150) to an eye-tracking camera (e.g. camera 190). Those skilled in the art understand that the array of infrared light sources 150 on a transparent substrate could also be included advantageously in a VR headset where the transparent nature of the optical structure allows a user to view a display in the VR headset. In some embodiments of FIG. 1A, image light is only directed into one eye of the wearer of HMD 100. In an embodiment, both displays 130A and 130B are included to direct image light into waveguides 160A and 160B, respectively.

Lens 121B includes an array of VCSELs as infrared light sources 150 arranged in an example 5×5 array. The VCSELs 150 in the array may not be evenly spaced, in some embodiments. Although VCSELs and near-infrared light is referenced throughout the disclosure, it is understood that the VCSELs may be replaced with other light sources and the referenced near-infrared light is an example wavelength of non-visible light and that other wavelengths of non-visible light may also be used. VCSELs 150 may be near-infrared light sources directing their emitted near-infrared light in an eyeward direction to an eyebox area of a wearer of HMD 100. VCSELs 150 may emit a near-infrared light having a wavelength of 850 nm or 940 nm, for example. Very small metal traces or transparent conductive layers (e.g. indium tin oxide) may run through lens 121B to facilitate selective illumination of each VCSEL 150. Lens 121A may be configured similarly to the illustrated lens 121B.

In aspects of this disclosure, visible light may be defined as having a wavelength range of approximately 380 nm-700 nm. Non-visible light may be defined as light having wavelengths that are outside the visible light range, such as ultraviolet light and infrared light. Infrared light having a wavelength range of approximately 700 nm-1 mm includes near-infrared light. In aspects of this disclosure, near-infrared light may be defined as having a wavelength range of approximately 700 nm-1.4 μm.

While VCSELs 150 may introduce occlusions into an optical system included in an HMD 100, VCSELs 150 and corresponding routing may be so small as to be unnoticeable or optically insignificant to a wearer of an HMD. Additionally, any occlusion from VCSELs 150 will be placed so close to the eye as to be unfocusable by the human eye and therefore assist in the VCSELs 150 being not noticeable. In addition to a wearer of HMD 100 not noticing VCSELs 150, it may be preferable for an outside observer of HMD 100 to not notice VCSELs 150.

FIG. 1B illustrates a footprint of a VCSEL in accordance with embodiments of the disclosure. In some embodiments, each VCSEL 150 has a footprint where the "x" dimension is less than 200 microns and the "y" dimension is less than 200 microns. In some embodiments, each VCSEL 150 has a footprint where the "x" dimension is less than 100 microns and the "y" dimension is less than 100 microns. In some embodiments, each VCSEL 150 has a footprint where the "x" dimension is less than 75 microns and the "y" dimension is less than 75 microns. At these dimensions, the VCSELs 150 may not only be unnoticeable to a wearer of an HMD 100, the VCSELs 150 may be unnoticeable to an outside observer of HMD 100.

FIG. 2 illustrates a near-eye optical system 200 that includes a side view of an array of VCSELs 250 illuminating an eyebox area, in accordance with an embodiment of the disclosure. The array of VCSELs 250 includes VCSELs 250A, 250B, 250C, 250D, and 250E, in the illustrated embodiment. VCSEL 250C illuminates eye 202 with near-infrared beam 261. VCSELs 250A, 250B, 250D, and 250E may also illuminate eye 202 with near-infrared beams (not illustrated). Near-infrared light emitted by VCSEL 250C propagates along optical path 271 and reflects off of eye 202 as reflected near-infrared light propagating along optical path 272. The reflected near-infrared light propagating along optical path 272 travels through a transparent substrate that houses the VCSELs 250 and encounters optical combiner 230. Combiner 230 directs the near-infrared light to camera 210 along optical path 273. Therefore, system 200 shows how VCSELs 250 may illuminate eye 202 with near-infrared light and how camera 210 may capture near-infrared eye images of eye 202 by imaging the reflected near-infrared light. In some embodiments, camera 210 may be configured with a bandpass filter that accepts a narrow-band infrared light that is the same as the narrow-band emitted by VCSELs 250 while the filter rejects other wavelengths. For example, VCSELs 250 may emit narrow-band infrared light centered around 940 nm while camera 210 may include a filter that accepts infrared light around 940 nm while rejecting other light wavelengths.

It may be advantageous to tilt and shape the infrared light beams emitted by an array of VCSELs so that they illuminate the eye with the desired coverage and/or angle. Hence, it may be preferred to tilt and/or shape the near-infrared beams of the VCSELs according to a set of design constraints. A VCSEL on the edge of lens 121B may need a larger tilt angle to illuminate the eye whereas a VCSEL near the middle of lens 121B may need a very small (or zero) tilt angle to illuminate the eyebox area. In an embodiment, "tilt angle" is defined by the angle 207 between a vector 204 that is normal to a pupil plane 203 of eye 202 and a center ray 281 of the infrared cone/beam emitted by a particular infrared light source (e.g. VCSEL 250E). FIG. 2 illustrates that the tilt angle of VCSEL 250E may be much larger than the tilt angle of VCSEL 250C, for example.

The beam shape and/or beam divergence angle may also be adjusted for VCSELs in different positions on lens 121B so that the beam of the VCSEL has the desired illumination coverage of the eye. In one embodiment, the beam divergence angle increases as the VCSEL position gets closer to an outside boundary of the lens 121B where the outside boundary of lens 121B is the boundary of lens 121B that is closest to frame 114.

Figure 3:
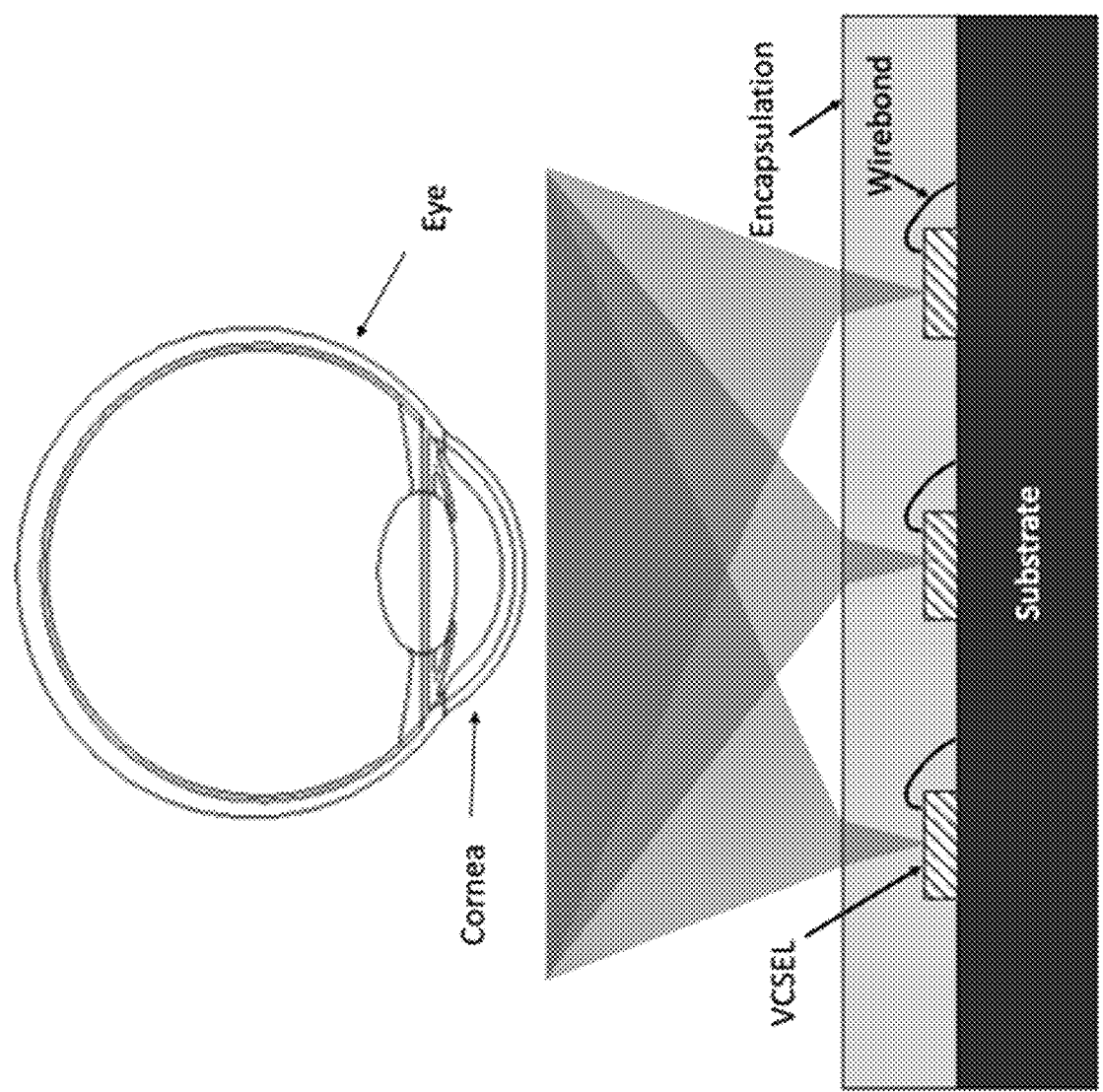
FIG. 3 illustrates an example in-field illumination system, in accordance with aspects of the disclosure.

Head-mounted display technologies such as virtual and augmented reality may include tracking of the eye movement in order to project the appropriate image to the eye. Hardware implementation of an eye-tracking scheme may include two subsystems: eye illumination and light collection. This disclosure is related to in-field eye illumination which may use light sources (e.g. VCSELs) in the user's field of view, as in FIG. 3, to determine the direction of the gaze and therefore efficiently deliver images to the eye. For increased efficiency, a Vertical-Cavity Surface-Emitting Laser (VCSEL) may be utilized. The small size of the VCSEL won't necessarily hinder see-through image quality of an augmented reality head mounted display since it is small and/or located outside of an eye's range of focus. VCSELs are often configured to emits a narrow cone of light that may be better directed toward the eye compared to some LEDs.

Figure 4:
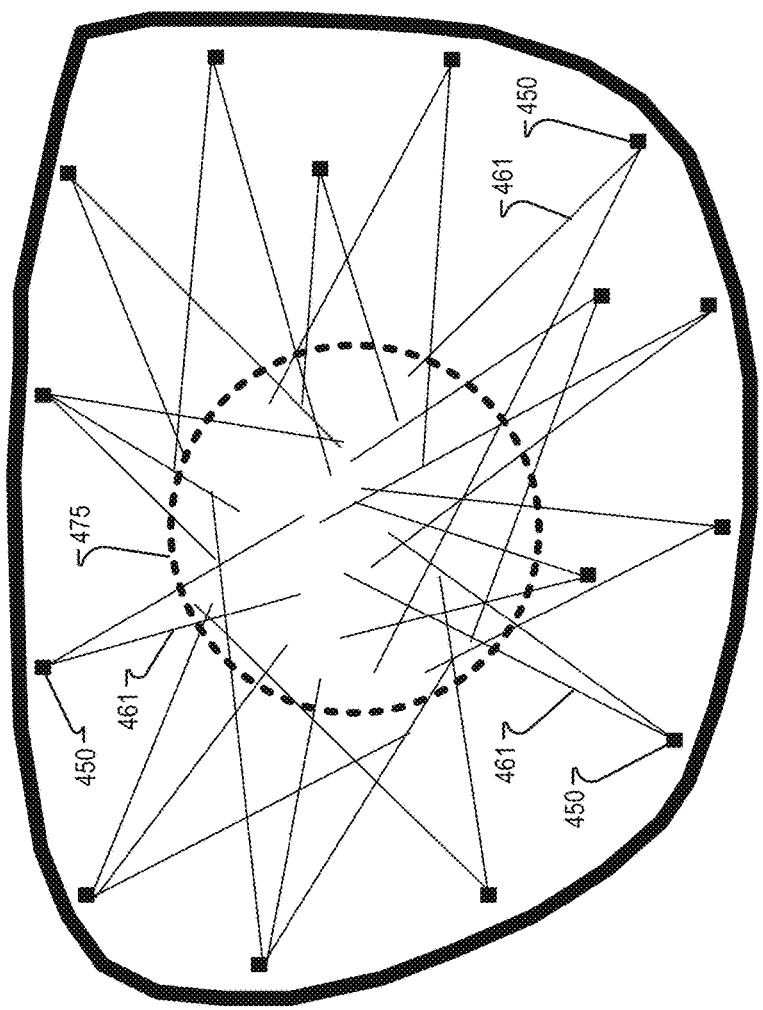
FIG. 4 illustrates an example near-eye optical element including a plurality of near-infrared light sources illuminating an eyebox area with near-infrared beams, in accordance with aspects of the disclosure.

One potential advantage of VCSELs is the possibility of a narrow cone of emission. However, for eye illumination it may be advantageous to expand and tilt the narrow cone to illuminate the eye. Embodiments of this disclosure may tilt and shape the beam, which may include expanding the beam. Embodiments of the disclosure may be efficient and may uniformly illuminate the eye from all directions as in FIG. 4 thus improving eye-tracking accuracy. FIG. 4 illustrates a near-eye optical element 400 including a plurality of near-infrared light sources 450 illuminating an eyebox area 475 with near-infrared beams, in accordance with aspects of the disclosure. In some implementations of the disclosure, the term "near-eye" may be defined as including an element that is configured to be placed within 50 mm of an eye of a user while a near-eye device is being utilized. Therefore, a "near-eye optical element" or a "near-eye system" would include one or more elements configured to be placed within 50 mm of the eye of the user.

The light reflected from the illuminated eye is then collected by another system that may include a combiner and a camera, as disclosed in FIG. 2. The image of the eye that is captured may be used to construct a model of the cornea which determines the gaze for eye-tracking purposes.

Although the disclosure may refer to VCSELs in certain embodiments, collimated LEDs and/or laser diodes may replace the illustrated or described VCSELs, in some embodiments. In some embodiments, an infrared light source has a full-width half-max (FWHM) emission angle of less than 50 degrees (e.g. 40 degrees or 30 degrees).

Figure 5:
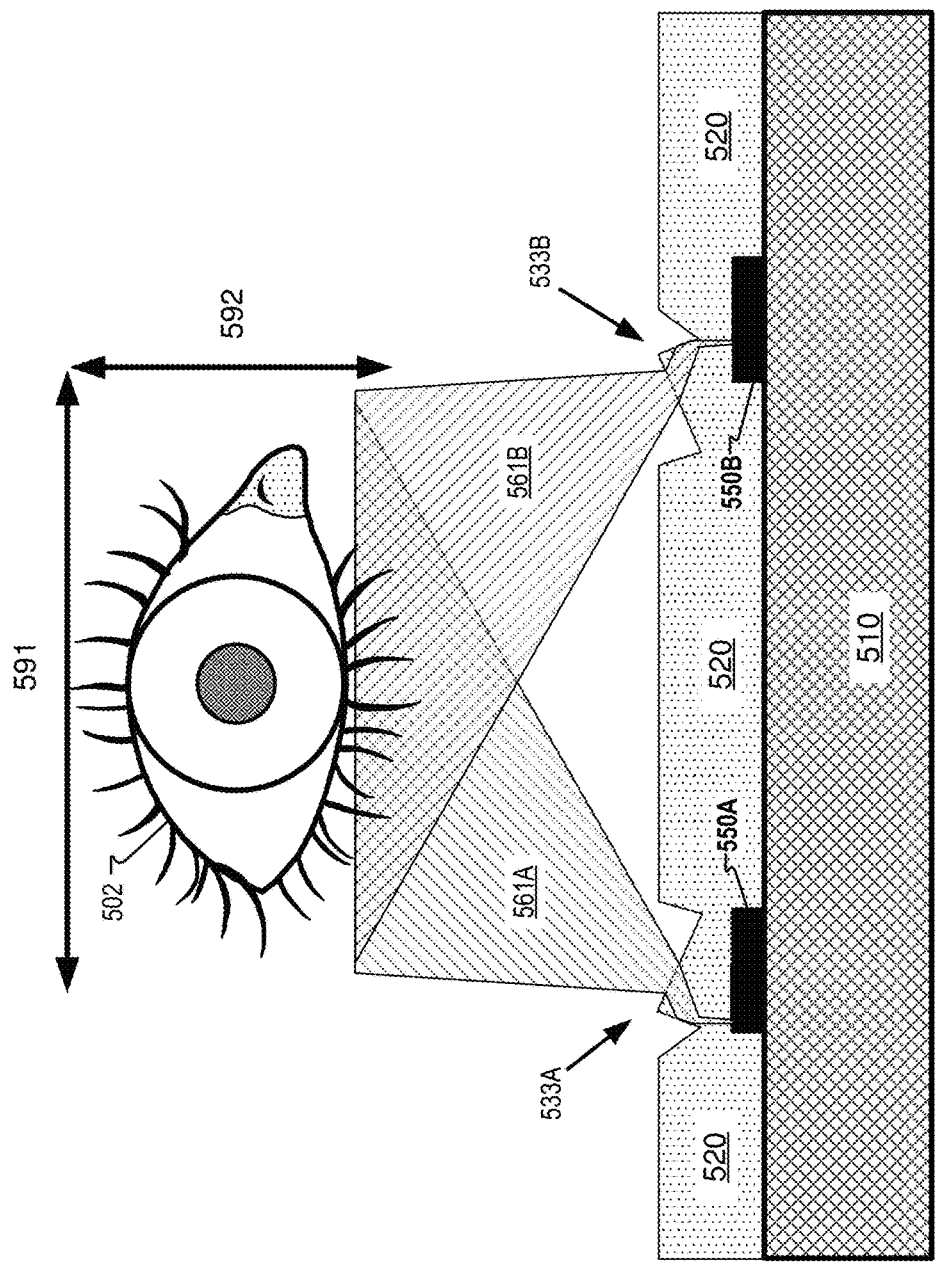
FIG. 5 illustrates a portion of an in-field illumination system that includes prisms with facets that tilt and expand the beam of an infrared VCSEL to illuminate an eye, in accordance with aspects of the disclosure.

FIG. 5 illustrates a portion of an in-field illumination system 500 that includes prisms 533 with facets that tilt and expand the beam of an infrared VCSEL, in accordance with aspects of the disclosure. System 500 may be included in a near-eye optical system. The infrared VCSELs 550A and 550B are disposed on a VCSEL "board" 510 which may include traces to turn the VCSELs ON and OFF. The VCSEL board may 510 be made from a transparent material and the traces that electrically connect the VCSELs may be small metal traces or made from transparent conductive materials (e.g. indium tin oxide "ITO"). By using the disclosed prisms 533, a large range of tilt angles are possible and beam expanding/focusing is possible. Furthermore, the utilization of Total Internal Reflection (TIR) principles may reduce or eliminate the need for special optical coatings on the component. Alternatively, reflective coatings of metal or dielectric materials can also be used in conjunction with the prisms. This may simplify manufacturing, which may lead to higher manufacturing yields and less expensive fabrication.

In FIG. 5, infrared light source 550A emits infrared beam 561A through its emission aperture and infrared light source 550B emits infrared beam 561B through its emission aperture. An optical structure (e.g. prism 533) disposed over the emission aperture of the infrared light source(s) may including a first facet and a second facet configured to tilt and/or shape the infrared beam 561 to propagate in an eye-ward direction to an eyebox area. In FIG. 5, the eyebox area may be defined by dimensions 591 and 592 around eye 502. In one embodiment, dimension 591 is approximately 30 mm and dimension 592 is approximately 20 mm. Infrared beams 561A at least partially overlaps with infrared beam 561B, in the example illustration of FIG. 5. Optical structure 533 may utilized the designs of any of the optical structures/prisms disclosed in FIGS. 6-13.

Figure 6:
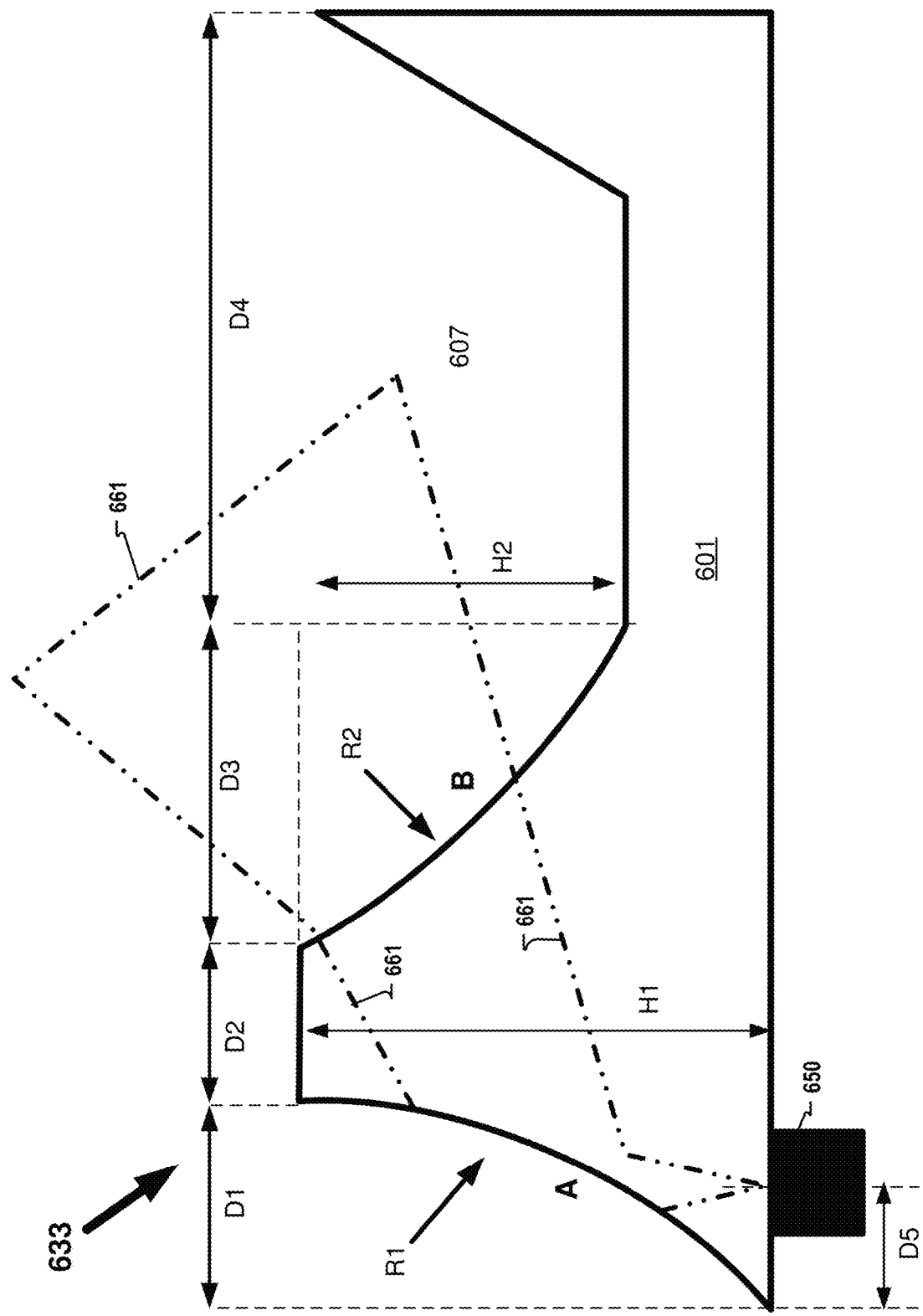
FIG. 6 illustrates an example prism structure formed of an optically transparent material, in accordance with aspects of the disclosure.
Figure 7:
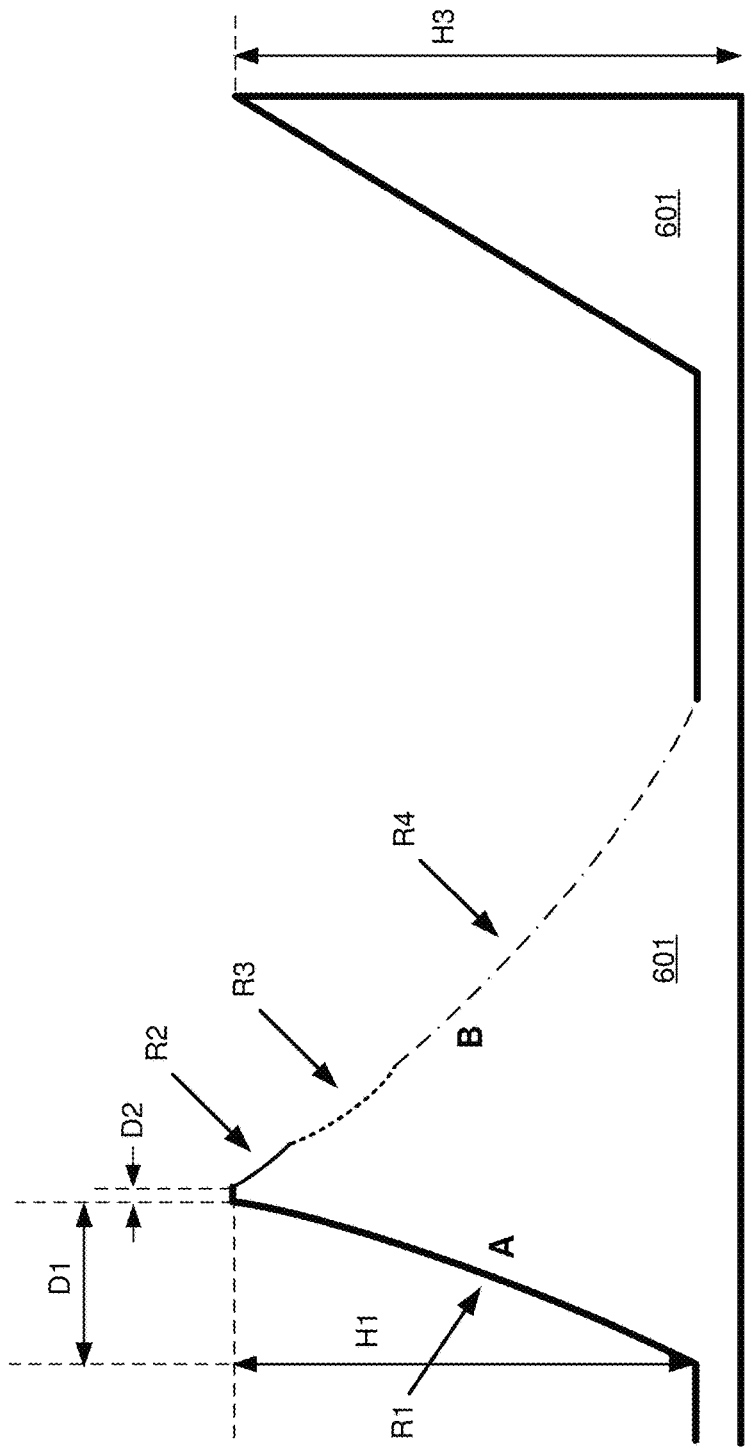
FIGS. 7-8 illustrate example prism structures having more than one radius of curvature that defines the surface of a facet, in accordance with aspects of the disclosure.
Figure 8:
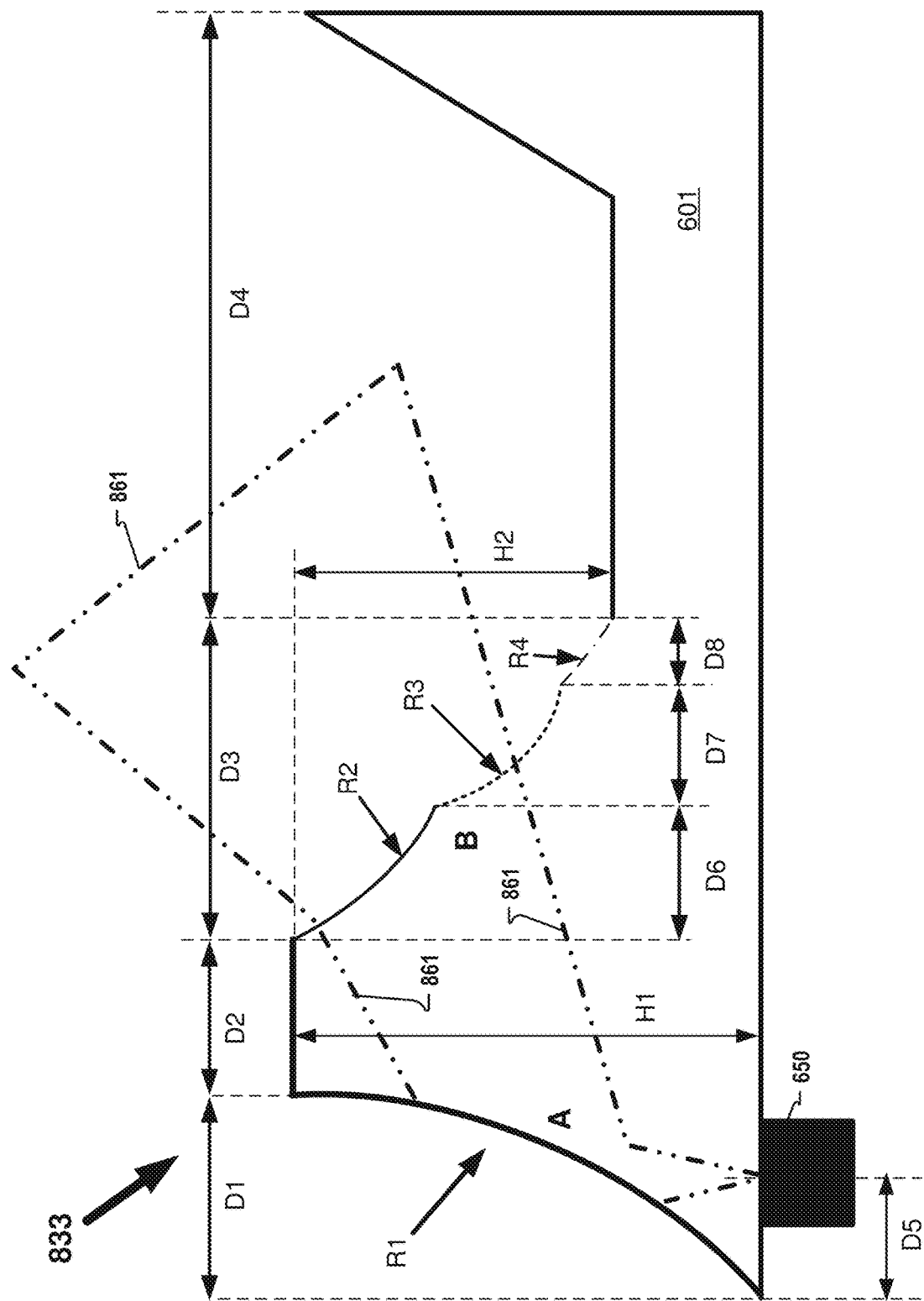

FIG. 6 illustrates an example prism structure 633 formed of an optically transparent material 601, in accordance with aspects of the disclosure. In FIG. 6, the infrared emission beam 661 of VCSEL 650 will be reflected by facet A having a curvature of radius R1 when the angle is steep enough to satisfy TIR conditions. The angle may be defined by the ratio of dimension D1 and height H1. The curvature (radius R1 in the illustrated embodiment) determines the divergence/convergence of the reflected beam. A concave facet A may generate a divergent beam while a convex facet A (not illustrated) may generate a convergent beam. The curvature of radius R2 and the angle of facet B (defined by dimension D3 and height H2) determines whether the beam will diverge or converge. A concave facet B may generate the divergent beam while a convex facet B may generate a convergence beam (not illustrated). It may be advantageous to design dimension D2 to be as short as possible. Dimension D4 needs to be large enough to create a void 607 in the optically transparent material 601 so as not to vignette or clip the outgoing beam 661. In an embodiment, height H1 may be approximately 200 microns, height H2 may be approximately 150 microns, radius R1 may be approximately 500 microns, radius R2 may be approximately 10,000 microns, dimension D1 may be approximately 60 microns, dimension D2 may be approximately 10 microns, dimension D3 may be approximately 65 microns, dimension D4 may be approximately 415 microns, and dimension D5 may be approximately 14 microns, FIGS. 7 and 8 illustrate a prism structure 733/833 where facet B includes more than one radius of curvature that defines the surface of facet B. This may improve the uniformity of the near-infrared beam 861 that is emitted. In FIG. 8, facet B includes a radius R2 having dimension D6, radius R3 having dimension D7, and radius R4 having dimension D8. FIG. 7 illustrates an example prism structure 733 that has example dimensions, in accordance with aspects of the disclosure. While multiple radius of curvatures is shown with regard to facet B in FIGS. 7 and 8, facet A may also include multiple radius of curvatures along its surface, in some embodiments. The radius of curvatures described with respect to facets A and B may instead be aspherical or freeform surfaces, in some embodiments.

The techniques used to fabricate prism structure 633/733/833 and other embodiments of the disclosure may include directly diamond turning the optically transparent material 601 to form the facets in a subtractive process. In one embodiment, an encapsulation layer is formed over the light sources (e.g. VCSELs) and a diamond turning process forms the facets in the encapsulation material. The encapsulation material may need to cure prior to the diamond turning process.

In one embodiment, a standalone rigid structure layer (e.g. PMMA) is cut using a diamond turning tool to form the facets. Once the standalone rigid structure has multiple facets formed in it, the standalone rigid structure is aligned with the substrate that includes an array of light sources (e.g. VCSELs) and the rigid standalone structure may be bonded to the substrate that includes the light sources where the facets of the rigid standalone structure are aligned with the emission apertures of the light sources.

In one embodiment, a negative mold (e.g. brass, nickel, glass, resin, etc.) is diamond turned and that negative mold is used to stamp or imprint an encapsulation layer with the shape of the facet. While the negative mold is imprinted on the encapsulation layer, the encapsulation layer may be cured by UV, for example. The negative mold may be coated with a release layer or anti-adhesion layer to assist the separation of the imprinted encapsulation layer from the negative mold. In some embodiments, grayscale lithography and/or etching techniques maybe used to form the prism structures disclosed herein.

Figure 9:
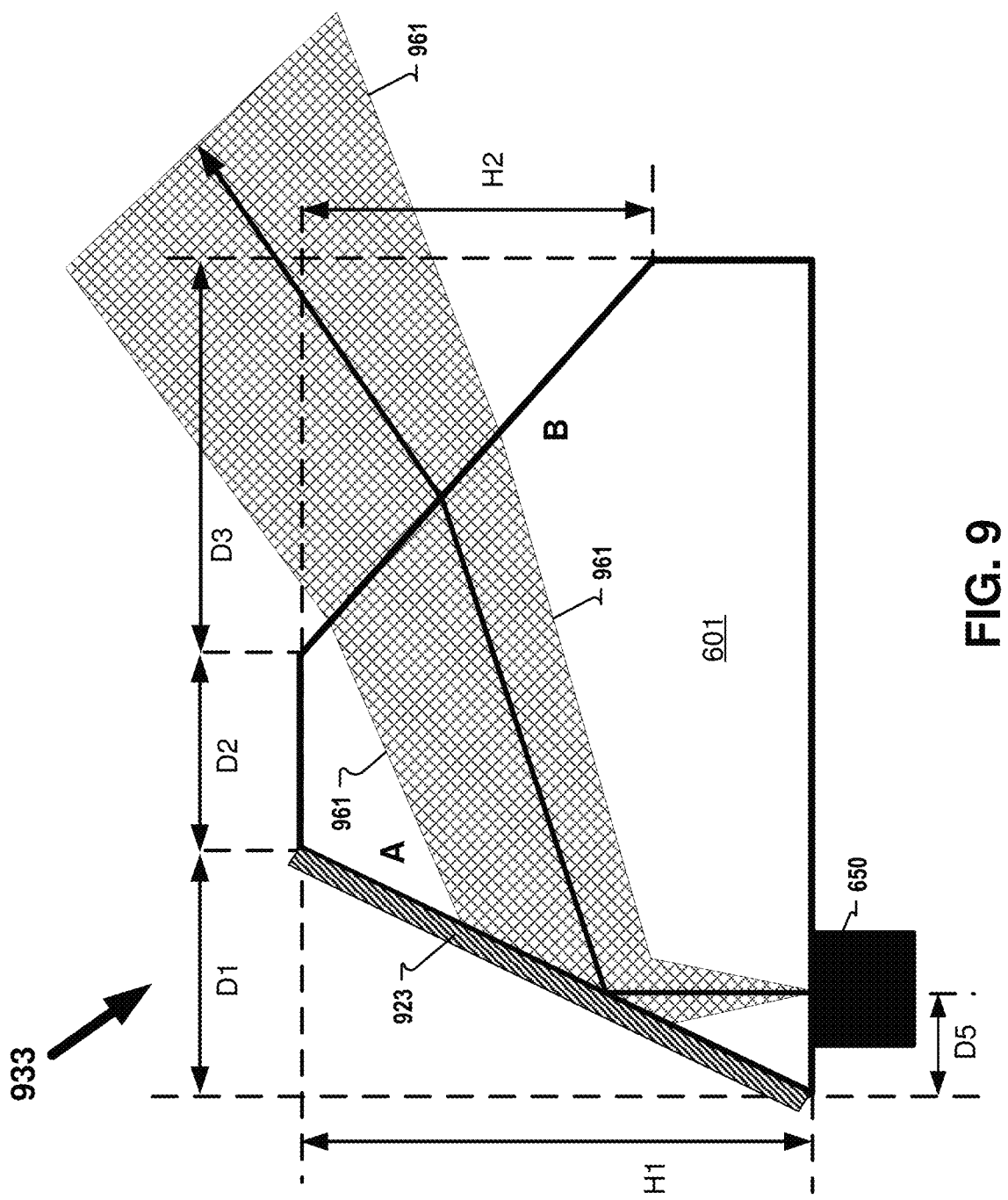
FIGS. 9-10 illustrate example prism structures that may utilize total internal reflection (TIR) to tilt and expand the near-infrared beam emitted from the VCSEL, in accordance with aspects of the disclosure.

FIG. 9 illustrates an example prism structure 933 that may utilize TIR to tilt and expand the near-infrared beam emitted from the VCSEL, in accordance with aspects of the disclosure. Optionally, a reflective layer 923 (e.g. metal or multi-layer dielectric) may be disposed on Facet A to effect reflection of the beam 961. Facet A of prism structure 933 may be a substantially flat surface, in some embodiments. Facet B of prism structure 933 may be a substantially flat surface, in some embodiments.

Figure 10:
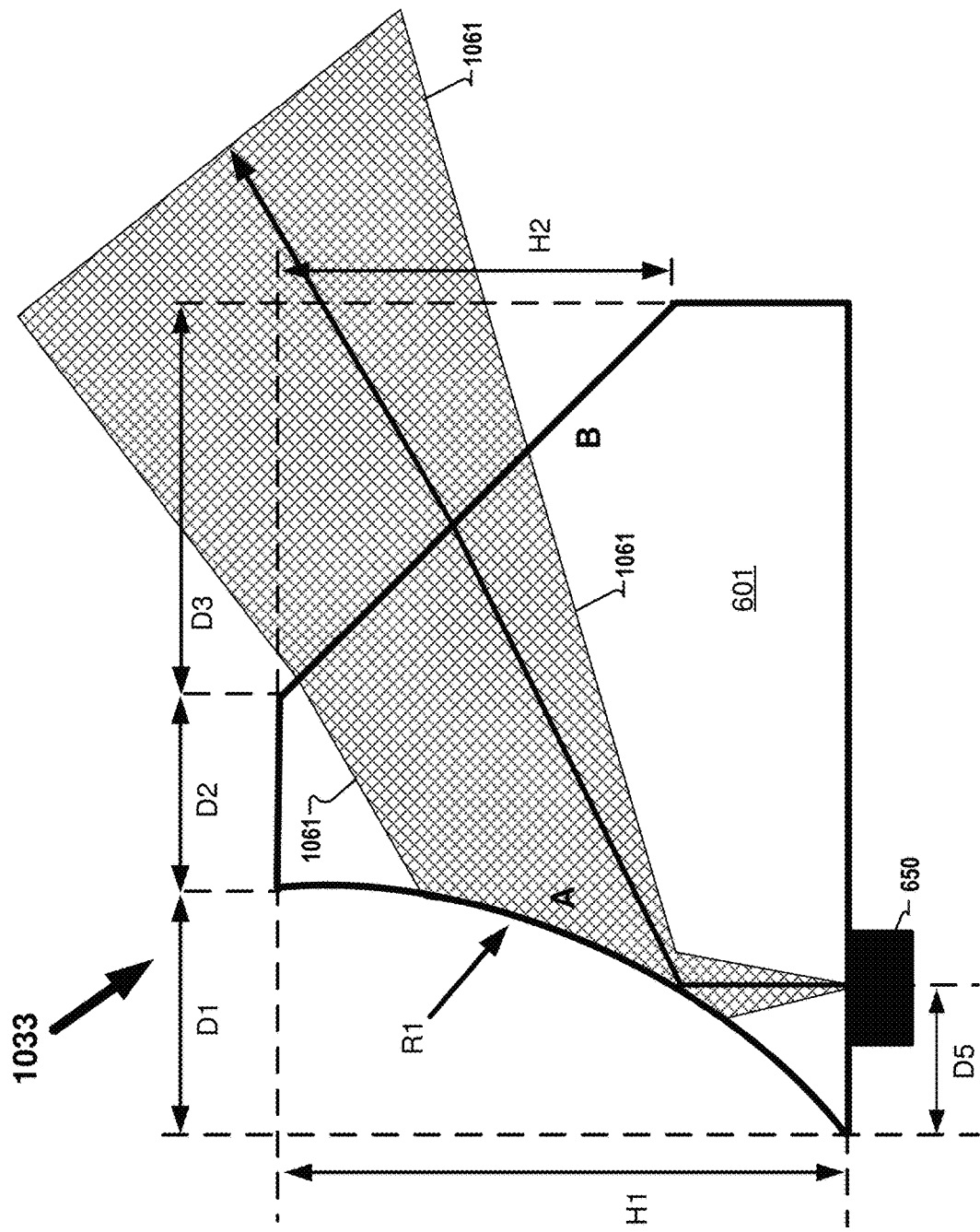

FIG. 10 illustrates an example prism structure 1033 that utilizes TIR to tilt and expand the near-infrared beam 1061 emitted from VCSEL 650. Facet A of prism structure 1033 has a radius of curvature R1 while facet B of prism structure 1033 may be a substantially flat surface, in some embodiments.

Figure 11:
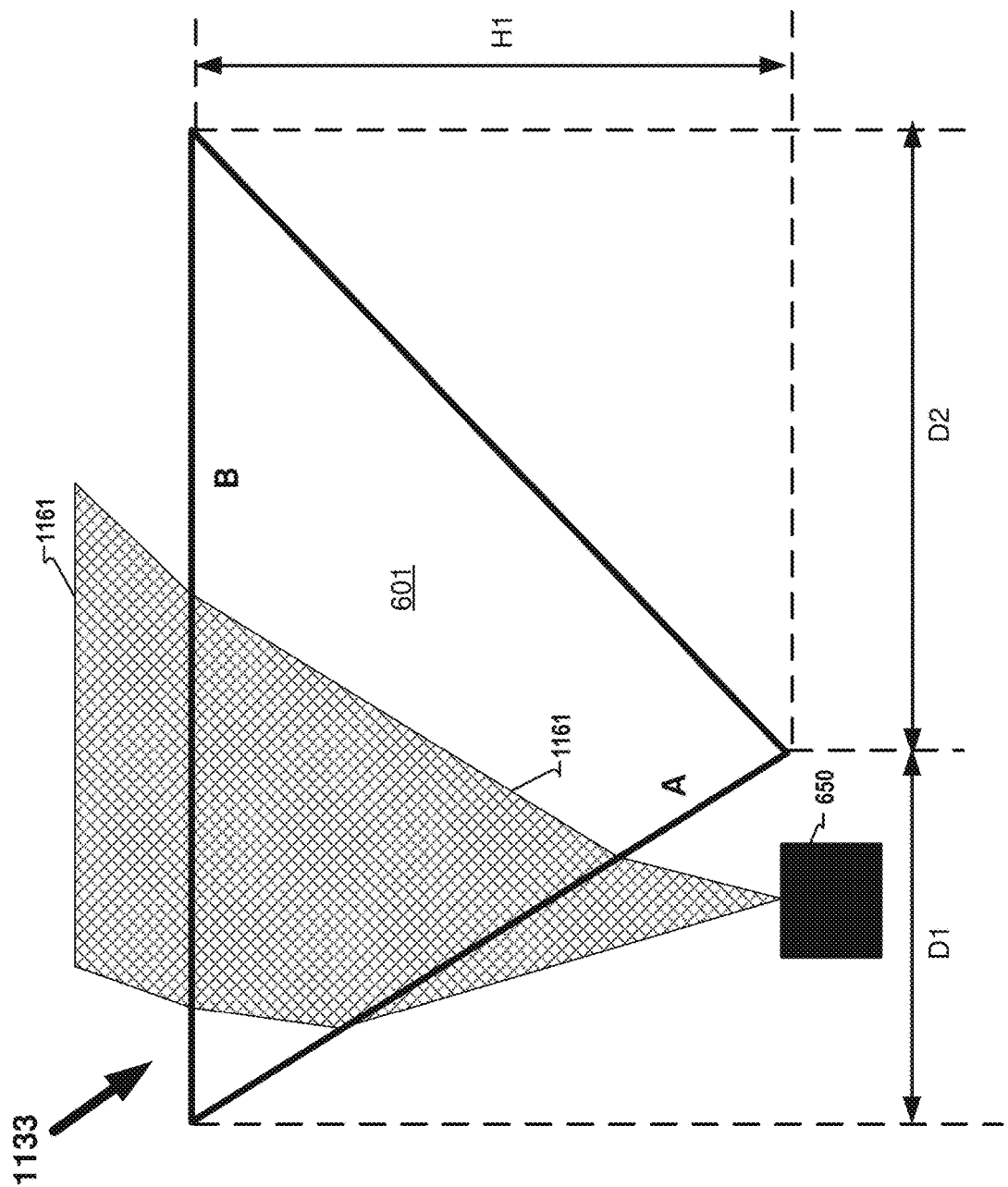
FIGS. 11-12 illustrate example optical structures that rely on the angle of a facet relative to the emission angle of a VCSEL to tilt and shape an infrared beam, in accordance with aspects of the disclosure.

FIG. 11 illustrates an example prism structure 1133 that does not utilize TIR, but instead relies on the angle of facet A relative to the emission angle of VCSEL 650 and the difference between the refractive index of material 601 and air (or a second material) to tilt and shape (e.g. expand) the near-infrared beam 1161 of the VCSEL.

Figure 12:
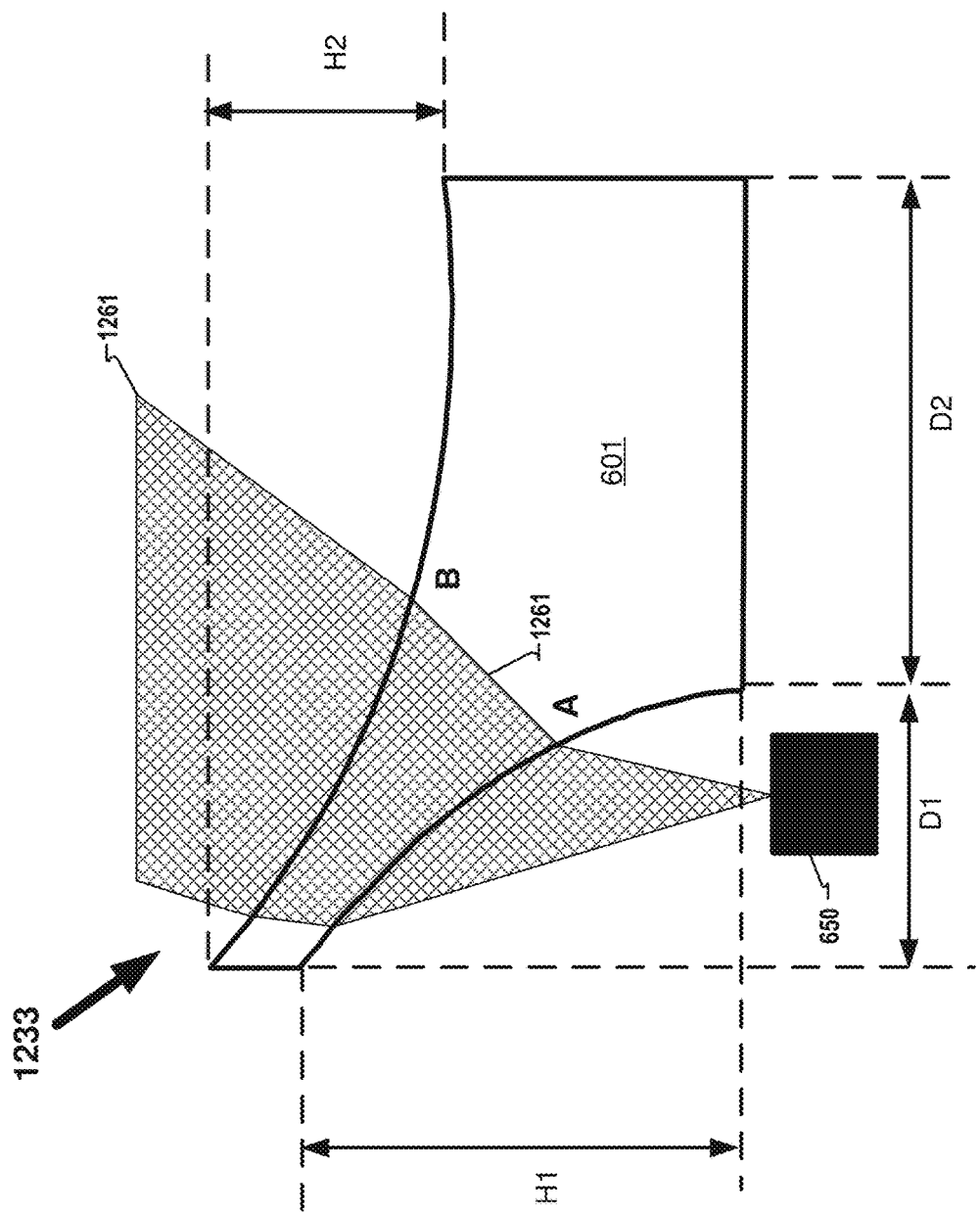

FIG. 12 illustrates another example prism structure 1233 that does not utilize TIR. Prism structure 1233 utilizes the curvature of facet A (which may be a spherical, aspherical, or freeform) and the curvature of facet B to tilt and shape (e.g. expand) the near-infrared beam 1261 of VCSEL 650.

Figure 13:
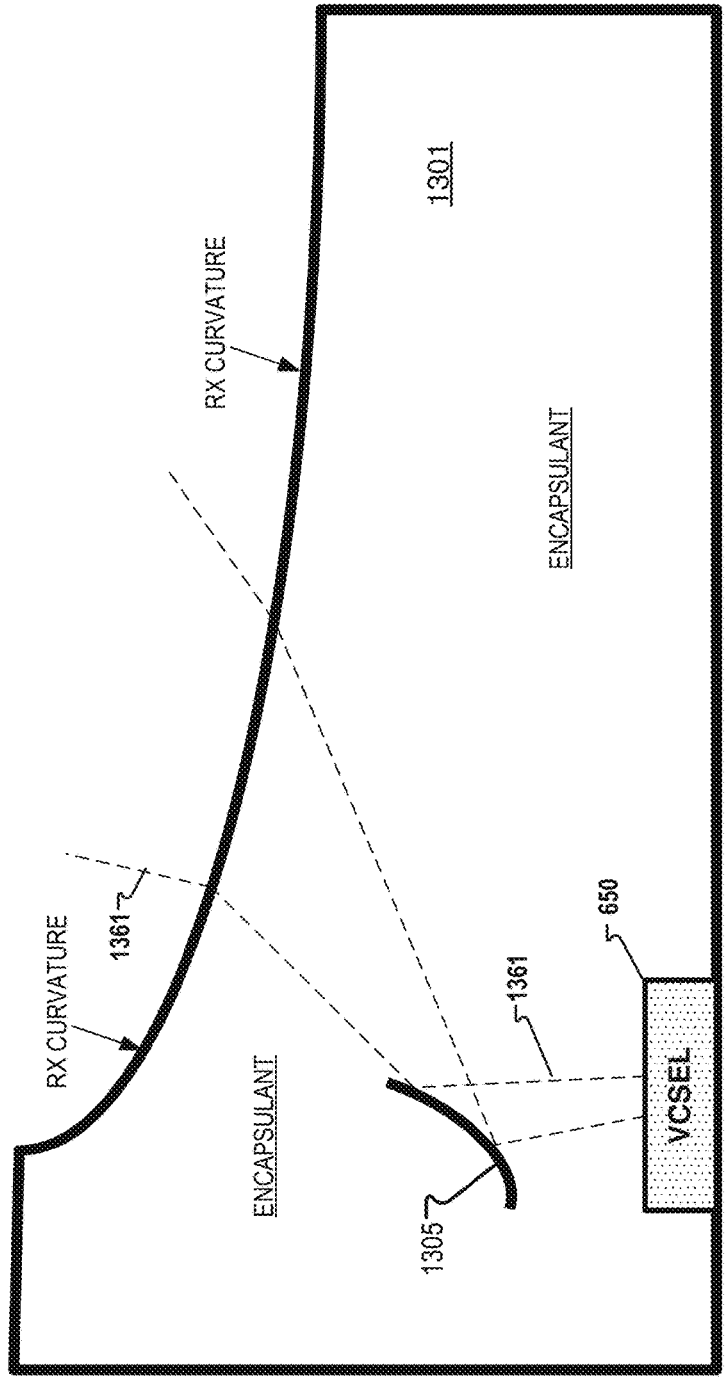
FIG. 13 illustrates an example beam shaping optical structure that includes an immersed dichroic mirror, in accordance with aspects of the disclosure.

FIG. 13 illustrates an example beam shaping optical structure 1300 that includes an immersed dichroic mirror, in accordance with an embodiment of the disclosure. In FIG. 13, an infrared VCSEL emits a near-infrared beam 1361 (indicated by dashed lines). The near-infrared beam 1361 encounters a dichroic mirror 1305 that is disposed on a curvature. The dichroic mirror 1305 may be immersed in an encapsulant, as illustrated. The dichroic mirror may be a "hot mirror" in that it reflects near-infrared light while passing visible light. Accordingly, if optical structure 1300 is within a FOV of an eye of the user, dichroic mirror 1305 will not significantly affect visible light propagating toward the eye. Dichroic mirror 1305 may also be significantly small enough to be unnoticeable by the eye.

Dichroic mirror 1305 is illustrated as disposed on a curvature that serves to expand (in reflection) the near-infrared beam emitted by the infrared VCSEL. In some embodiments, dichroic mirror 1305 may be disposed on a flat surface that is angled to expand the near-infrared beam. The shape that dichroic mirror 1305 takes may include the characteristics of facet A illustrated in FIGS. 6, 7, 8, 9, and 10, for example.

After the near-infrared beam 1361 is reflected by dichroic mirror 1305, it propagates through the encapsulant 1301 until it encounters the prescription (RX) curvature. The RX curvature may provide prescribed optical power for a user of an AR HMD. In the illustrated embodiment, the RX curvature is concave. Optical structure 1300 takes advantage of the RX curvature by using it as a way to further expand the near-infrared beam (the concave RX curvature combined with a changed in refractive index acts as a diverging lens). Furthermore, taking advantage of the concave RX curvature has the added benefit of reducing TIR that may be associated with a flat surface, for example. The surface profile of the RX curvature may be roughed slightly to further discourage TIR. Hence, optical structure 1300 utilizes the RX curvature as a second facet for expanding the beam. This may work especially well where a VCSEL is located at the edge of a lens for glasses or near the rim of the glasses. Utilizing an RX curvature as the second facet to expand a near-infrared beam may also be applied to other embodiments of this disclosure.

The encapsulant may be an optical grade transparent material with a refractive index of 1.5 to 1.7, for example. As the near-infrared beam 1361 escapes the encapsulant, it may encounter air having a refractive index of 1 or a different transparent material with a different (e.g. lower) refractive index than the encapsulant.

Embodiments of the disclosure may further include an illumination system having a transparent circuit board, a prism, and at least one VCSEL having at least one emitting aperture. The VCSEL may be mounted on the transparent circuit board. The prism may include at least three facets. Infrared light emitted by the at least one VCSEL enters through the entry facet, a reflection facet reflects light toward an exit facet, where the beam refracts and exits the prism. The prism is mounted on the emitting aperture of the VCSEL.

In an embodiment, the second facet deflects the beam by a certain angle determined by the tangential component (slope) of facet A (H1/D1 ratio) of FIG. 9. The reflection is either based on total internal reflection (TIR) or is enabled by a reflective coating on the second facet (facet A).

In an embodiment, the tangential component (slope) of facet B (H2/D1 ratio) determines the beam deflection at that interface.

In an embodiment, at least one facet has a curvature to act as a beam shaping device to converge or diverge (focus or defocus) the beam of light as in FIG. 10.

In an embodiment, at least one facet consists of multiple segments each having a certain radius of curvature thus helping more uniformly distribute the light energy within exiting the prism as in FIG. 8.

In an embodiment, the prism is immersed in a material having a lower index of refraction compared to that of the prism.

In an embodiment, the fabricated prism(s) use a material such as polymer, glass, etc. either in the form of a surface protrusion or indentation.

In an embodiment, the prism is fabricated by creating indentation in a material such as polymer, glass, etc. and D4 in FIG. 8 is large enough that does not clip or vignette or interfere with the outgoing light beam.

In an embodiment, a first facet (e.g. facet A in FIGS. 11 and 12) not being perpendicular to the incoming light beam 1161/1261 entering the prism 1133/1233 whereby the slope of the first facet (H1/D1 ratio) determines the tilt or deflection of the beam due at the facet through refraction as in FIG. 11. A second facet (e.g. facet B in FIGS. 11 and 12) may further deflect the beam 1161/1261 through refraction with the slope of the facet (H2/(D1+D2) in FIG. 12) determining beam deflection/tilt. In embodiments of the disclosure, facet A may be configured to diverge the infrared beam and facet B may be configured to tilt the near-infrared beam in an eye-ward direction. Facet B may also be configured to further diverge the near-infrared beam.

In embodiments such as FIG. 12, one or both of the entrance facet (e.g. facet A) and exit facet (e.g. facet B) are curved in order to shape the beam thus either focusing or defocusing the near-infrared beam 1261.

In an embodiment, either one or both entrance and exit facets consist of more than one segment with each segment having a certain radius of curvature in order to more uniformly illuminate the eye.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A near-eye optical system comprising:
a non-visible light source having an emission aperture, wherein the non-visible light source is configured to emit a non-visible beam through the emission aperture; and
an optical structure including an optically transparent material disposed over the emission aperture, wherein the optical structure includes:
a first facet formed in the optically transparent material; and
a second facet formed in the optically transparent material, wherein the first facet is angled to reflect the non-visible beam to exit the second facet as a non-visible exit beam propagating in an eye-ward direction,
wherein the first facet and the second facet are together configured to diverge the non-visible beam and tilt the non-visible beam in the eye-ward direction.

2. The near-eye optical system of claim 1, wherein a reflective layer is disposed on the first facet to reflect the non-visible beam toward the second facet.

3. The near-eye optical system of claim 1, wherein the first facet is a concave facet configured to diverge the non-visible beam in reflection, wherein the second facet is a concave facet configured to diverge the non-visible beam in transmission.

4. The near-eye optical system of claim 1, wherein the second facet includes a plurality of curvatures formed in a surface of the second facet to diverge the non-visible beam in transmission.

5. The near-eye optical system of claim 1, wherein an angle of the first facet with respect to the non-visible beam incident on the first facet allows the first facet to rely on total internal reflection (TIR) to reflect the non-visible beam to the second facet.

6. The near-eye optical system of claim 1, wherein a void in the optically transparent material is sized to allow the non-visible beam to illuminate an eye without encountering the optically transparent material after exiting the second facet.

7. The near-eye optical system of claim 1, wherein at least one of the first facet or the second facet is substantially a flat surface.

8. The near-eye optical system of claim 1, wherein at least one of the first facet or the second facet is spherical.

9. The near-eye optical system of claim 1, wherein the non-visible beam is a near-infrared wavelength.

10. The near-eye optical system of claim 1, wherein the non-visible light source includes a vertical-cavity surface-emitting laser (VCSEL).

11. The near-eye optical system of claim 1 further comprising:
a camera configured to image reflections of the non-visible beam reflecting off of an eye to generate an infrared eye image, wherein the camera is configured to image a near-infrared wavelength range of the non-visible beam and reject light wavelengths outside the near-infrared wavelength range.

12. The near-eye optical system of claim 11 further comprising:
an optical combiner configured to direct the reflections of the infrared beam to the camera.

13. A near-eye optical element comprising:
a plurality of near-infrared light sources configured to emit a near-infrared beam out of an emission aperture of the near-infrared light source;
a contiguous transparent optical layer including a plurality of prisms formed in the contiguous transparent optical layer, wherein the prisms are aligned over the emission apertures of the near-infrared light sources, and wherein each prism includes:
a first facet formed in the contiguous transparent optical layer; and
a second facet formed in the contiguous transparent optical layer, wherein the first facet is angled to reflect the near-infrared beam to exit the second facet as a near-infrared exit beam,
wherein the prisms in the plurality of prisms are configured to generate a different beam divergence angle of the near-infrared exit beam.

14. The near-eye optical element of claim 13, wherein a tilt angle of the near-infrared exit beam increases as a particular prism in the plurality of prisms gets closer to an outside boundary of the contiguous transparent optical layer.

15. The near-eye optical element of claim 13, wherein the beam divergence angle of a given near-infrared light source in the plurality of near-infrared light sources increases as the given near-infrared light source gets closer to an outside boundary of the contiguous transparent optical layer.

16. A near-eye optical element comprising:
- a near-infrared light source having an emission aperture, wherein the near-infrared light source is configured to emit a near-infrared beam through the emission aperture; and
- an optical structure including an optically transparent material disposed over the emission aperture, wherein the optical structure includes:
  - a reflective layer immersed in the optically transparent material; and
  - a curvature formed in the optically transparent material, wherein the reflective layer reflects the near-infrared beam to exit the curvature as a near-infrared exit beam propagating in an eye-ward direction.

17. The near-eye optical element of claim 16, wherein the reflective layer includes a curvature configured to diverge the near-infrared beam, and wherein the reflective layer includes a dichroic mirror configured to reflect the near-infrared beam while passing visible light.

18. The near-eye optical element of claim 16, wherein the curvature formed in the optically transparent material is a prescription curvature of a lens for focusing visible light to an eye of a user of the near-eye optical element, wherein the prescription curvature is also configured to diverge the near-infrared beam.

\* \* \* \* \*